Inventor
A. H. Kyler
By Seymour & Bright
Attorney

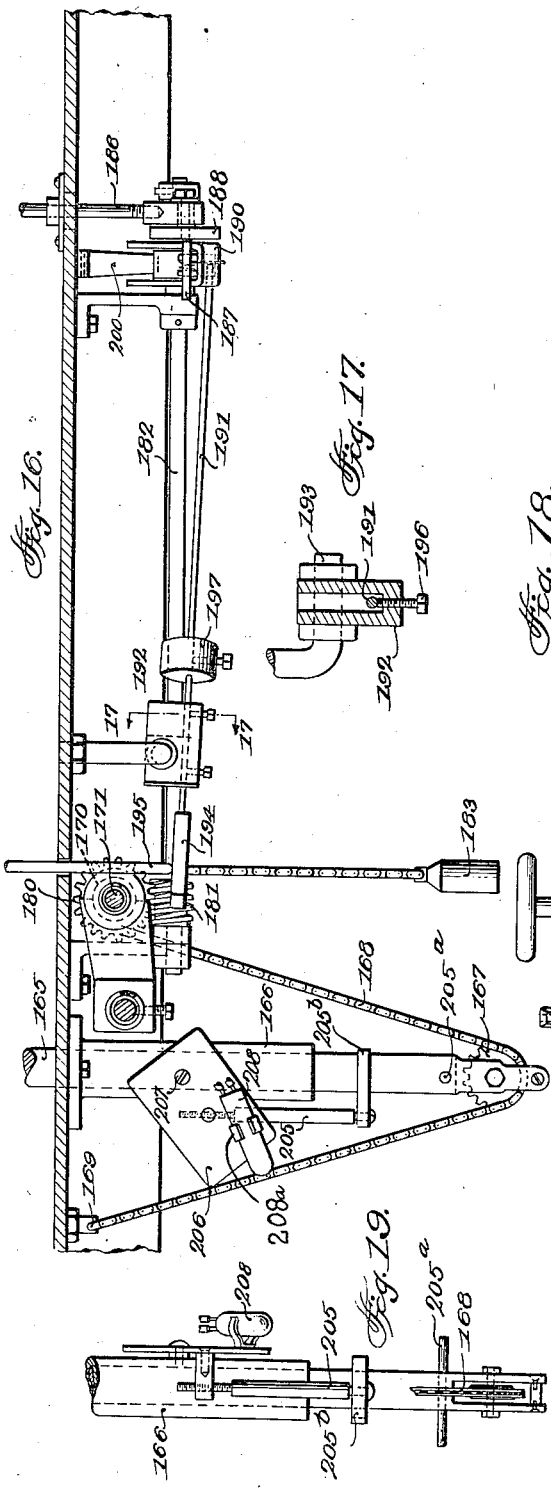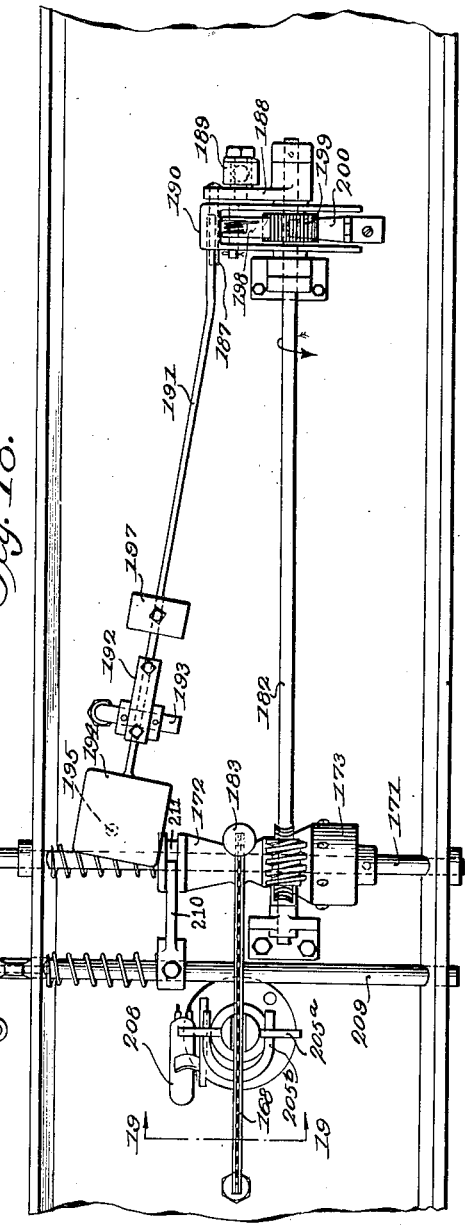

May 4, 1937.  A. H. KYLER  2,079,321
CAN LABELING MACHINE
Filed May 25, 1935   8 Sheets-Sheet 8
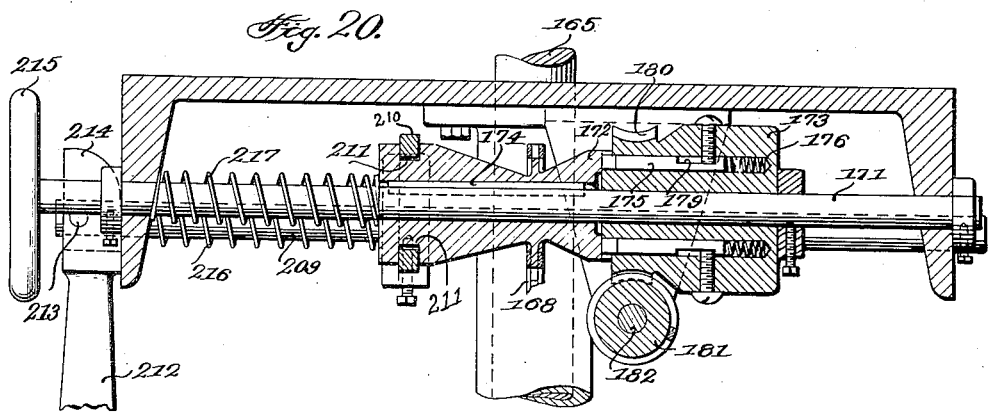
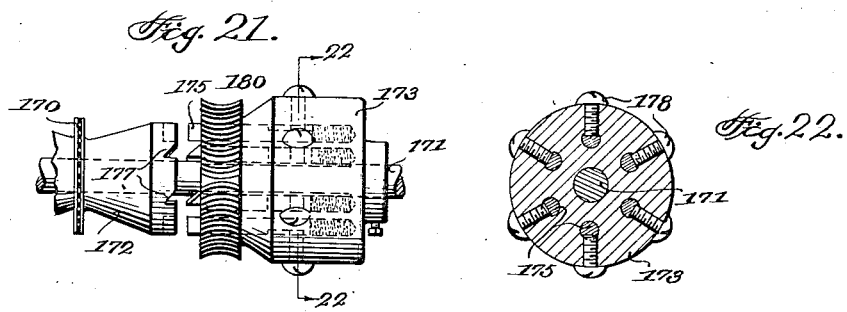
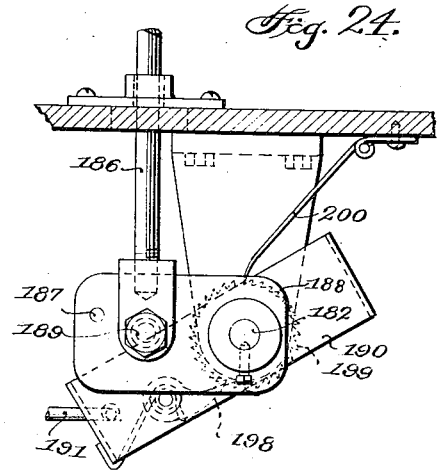
Inventor
A. H. Kyler
By Seymour & Bright
Attorney Patented May 4, 1937

2,079,321

UNITED STATES PATENT OFFICE 2,079,321

CAN LABELING MACHINE

Albert H. Kyler, Westminster, Md.

Application May 25, 1935, Serial No. 23,507

17 Claims. (Cl. 216—58)

This invention relates to improvements in can labeling machines and more especially to improvements in can labeling machines of the type designed to place labels about cylindrical cans as they roll through the machine.

Some of the objects of the invention are to provide a machine of this type in which the cans will be labeled with greater rapidity, one by which simple adjustments may be speedily made to accommodate cans of various diameters and lengths; in which the paste will be placed on the cans in an even manner without liability of solid particles being deposited with the paste; in which the label stack will be maintained in proper positions to supply the labels, and in which the labels will be smoothed out on each can as the latter travels through the machine.

With the foregoing objects outlined and with other objects in view which will appear as the description proceeds, the invention consists in the novel features hereinafter described in detail and pointed out in the appended claims.

In the drawings:

Fig. 13 is a transverse vertical sectional view taken on line 13—13 of Fig. 2, and illustrating a portion of the means employed for laterally adjusting a portion of the can-supporting tracks of the machine.

Fig. 14 is a perspective view of a portion of one of the can-guiding tracks that cooperate with the label stack.

Fig. 15 is a vertical sectional view of a detail taken on the line 15—15 of Fig. 4, and showing a portion of the operating means for the paste-feeding pump and a portion of the label smoothing mechanism.

Fig. 16 is a longitudinal vertical sectional view of the means for operating and controlling the label platform or elevator.

Fig. 17 is a transverse sectional view of a detail taken on the line 17—17 of Fig. 16.

Fig. 18 is a bottom plan view of the mechanism shown in Fig. 16.

Fig. 19 is an elevation partly in transverse section of a detail taken on the line 19—19 of Fig. 18.

Fig. 20 is an enlarged transverse vertical sectional view of a portion of the operating and controlling means for the elevator platform taken on the line 20—20 of Fig. 3.

Fig. 21 is a side elevation of a clutch forming part of the label elevator controlling means.

Fig. 22 is a vertical sectional view of the clutch taken on the line 22—22 of Fig. 21.

Fig. 23 is a perspective view of one of the retractable clutch teeth.

Fig. 24 is an enlarged transverse sectional view of a portion of the label elevator operating and controlling means taken on the line 24—24 of Fig. 2.

Fig. 25 is a diagram of the electric wiring system forming part of the machine.

Figure 1:
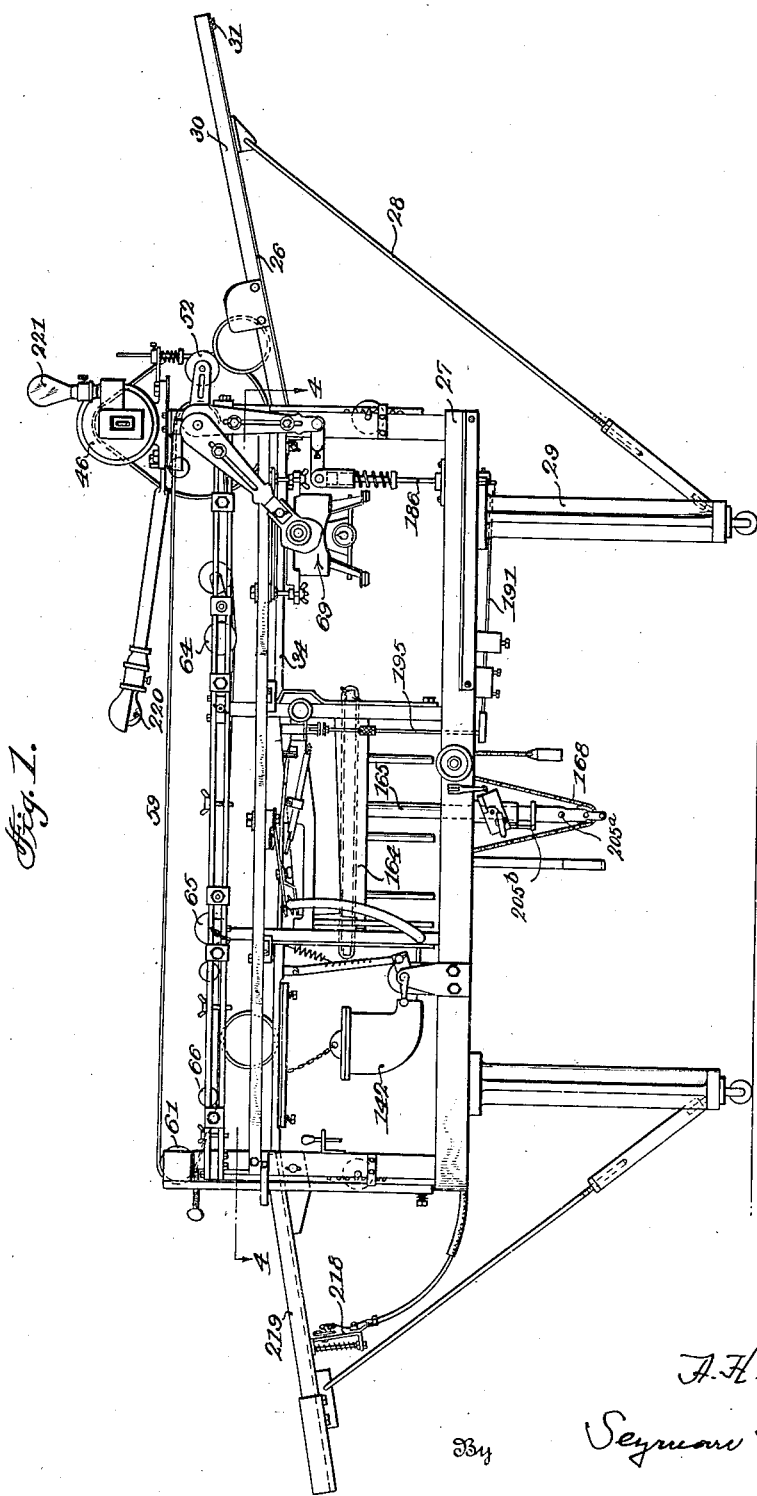
Fig. 1 is a side elevation of the improved machine.
Figure 2:
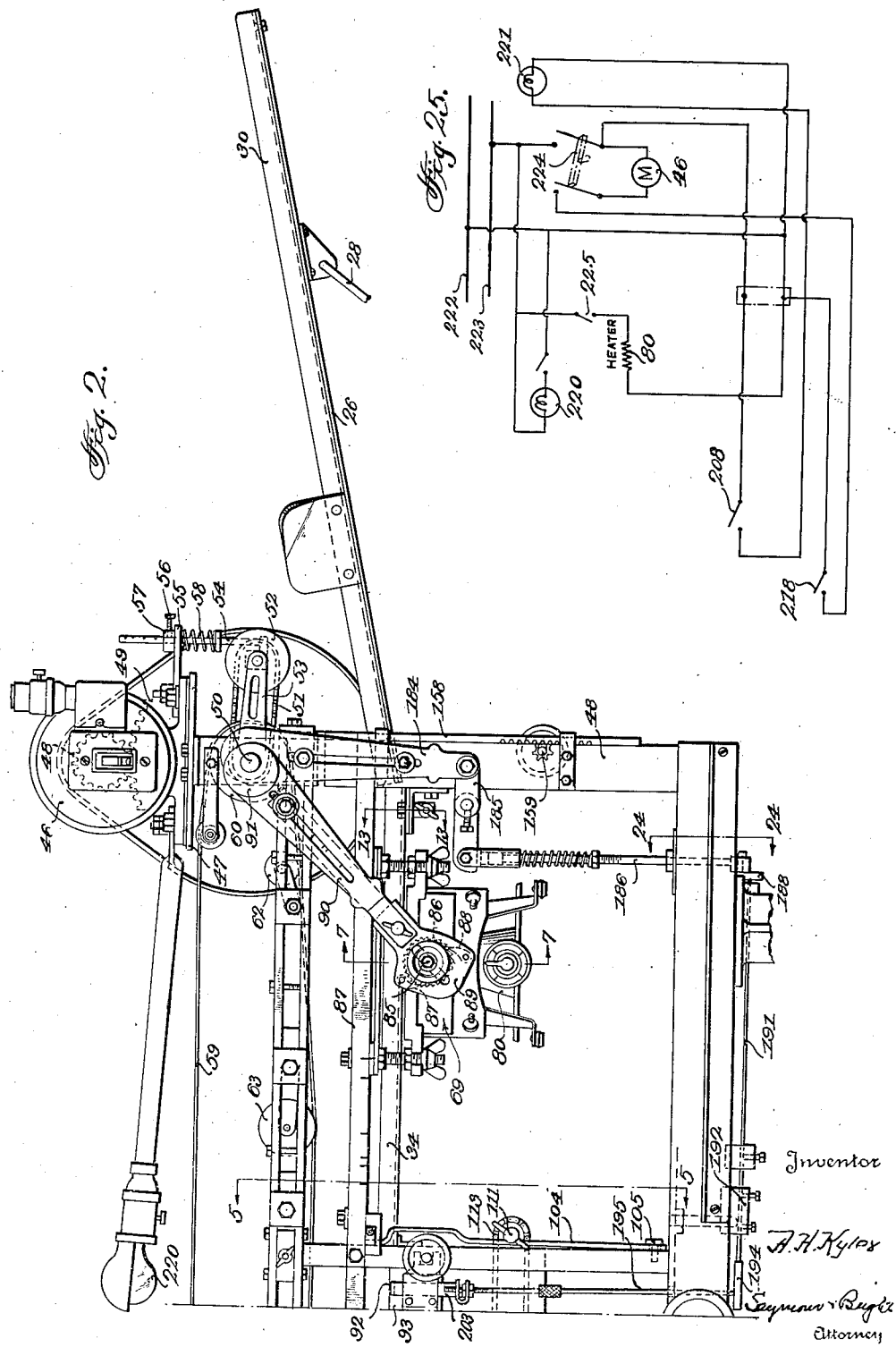
Fig. 2 is an enlarged view of the feeding end portion of the same.
Figure 4:
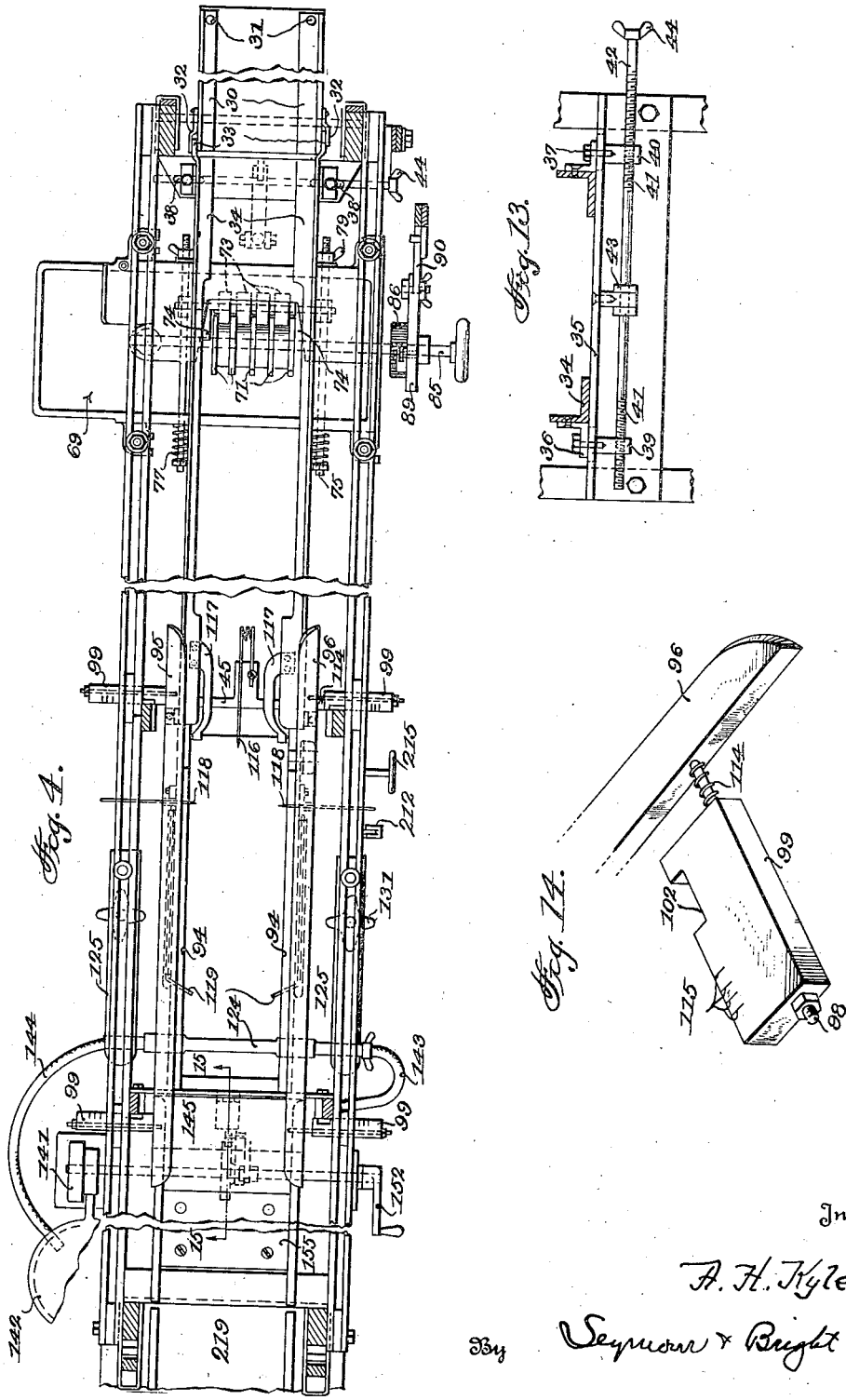
Fig. 4 is an enlarged transverse horizontal sectional view taken on line 4—4 of Fig. 1.

Referring first to Figs. 1 and 2, 26 designates the base plate of a can-feeding runway which inclines downwardly toward the feed end of the machine. One end of this runway is supported by the frame 27 of the machine and the opposite end portion is supported by a strut 28 resting on one of the legs 29 of the machine. A pair of angle iron tracks 30 have their upper ends pivotally connected to the base 26 as shown at 31 and the pivoted ends of these tracks are spaced a sufficient distance apart, as shown in Fig. 4, to accommodate cans of maximum length. The inner ends of these tracks, as shown in the same figure, are bifurcated as at 22 to accommodate fingers 33 projecting from angle iron tracks 34 supported by the frame of the machine.

Tracks 34 are mounted for movement toward and away from one another to accommodate cans of various lengths and obviously when the tracks 34 are adjusted, the fingers 33 will cause the runway tracks 30 to swing on their pivots 31. For the purpose of adjusting the leading ends of the tracks 34, such tracks slidably rest, as best shown in Fig. 13, on a transverse horizontal bar 35, and each rail has a bracket 36 carrying a pin 37 movable in a transverse slot 38. The lower ends of the pins are secured to blocks 39 and 40 having respectively right and left internal threads to accommodate right and left threads 41 on a rotatable screw 42 which is swiveled in a bearing 43 depending from the bar 35. Obviously when the operator turns the handle 44 of the screw, the leading ends of the tracks 34 and the trailing ends of the tracks 30 will move in unison toward or away from one another, depending on the direction in which the screw is rotated.

The trailing ends of the rails 34 are slidably supported by a cross bar 45 forming part of the machine frame, and these ends are adjusted laterally by the means hereinafter described.

As cans are fed into the machine and rolled down the runway 26 they are spaced from one another as they pass into the machine, and such spacing is accomplished in the following way. An electrically driven motor 46 is supported on a stationary platform 47 arranged upon the uprights 48 at the feed end of the machine, and this motor by means of suitable gearing 49 drives a transverse horizontal shaft 50 which, through the medium of a chain 51, continuously drives a spacing roller 52 rotated at a predetermined speed less than the speed at which the cans travel through the machine. The roller will engage each can as it rolls down the runway 26 and in order that the roller may cooperate with cans of various diameters, the roller is supported by levers 53 which are pivoted on the shaft 50. One of these levers is connected to a rod 54 which extends upwardly through a bracket 55 projecting from the platform 47. The position of the rod relatively to the bracket can be controlled by a set-screw 56 that extends through a collar 57 and impinges against the rod. A coil spring 58 coacts with the rod to yieldingly urge the spacing roller 52 downwardly.

Figure 5:
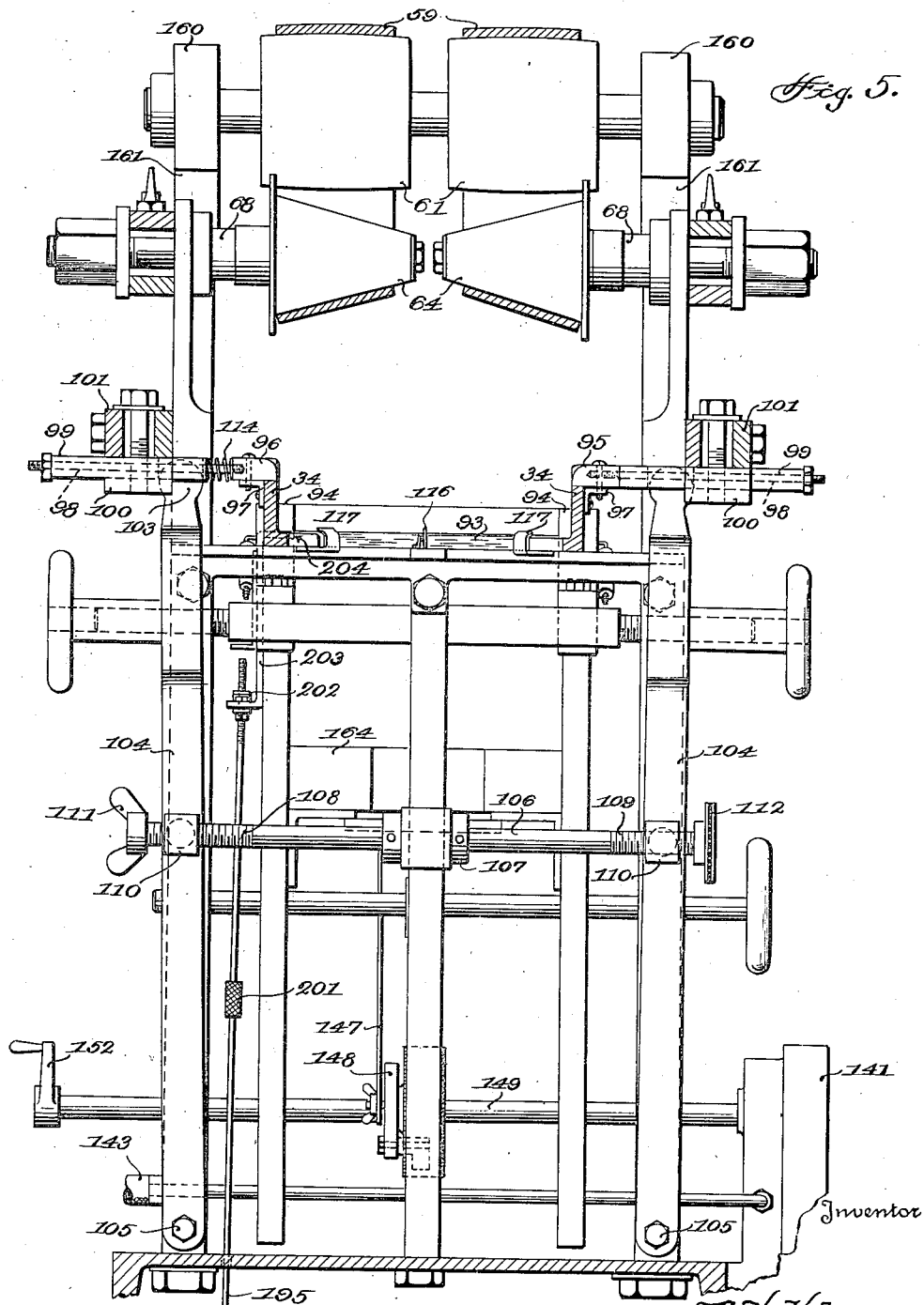
Fig. 5 is an enlarged transverse vertical sectional view taken on the line 5—5 of Fig. 2.
Figure 6:
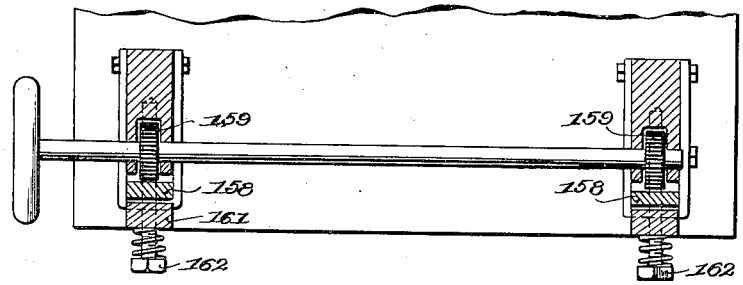
Fig. 6 is an enlarged transverse horizontal sectional view of a detail taken on the line 6—6 of Fig. 3, and illustrating a portion of the means for raising and lowering the conveyor belt guide rollers.

As the cans are spaced by the roller 52, they enter the feed end of the machine and roll along the tracks 34. They are propelled along these tracks by conveyer belts 59 driven by a roller 60 on the motor-driven shaft 50 at one end of the machine and guided by an idle roller 61 at the opposite end of the machine. These belts are also guided by rollers 62, 63, 64, 65 and 66 all supported by a frame 67 that is adjustable up and down to accommodate cans of various diameters. The rollers 63 and 64, as best illustrated in Fig. 5, are of frustro-conical shape to cause the lower bights of the belts to diverge downwardly so that they only engage the end edges of the cans while labels are being attached to the cans. Each of the rollers 62 to 66 inclusive, is mounted on a stud shaft 68 and adjustable lengthwise of the belt-supporting frame 67 so that the rollers may properly cooperate with the cans even though the latter may be of various diameters, and so far as the rollers 65, 66 are concerned, they are adjusted lengthwise of the frame to cause the belts to properly press on the cans after labels have been applied to them in a manner hereinafter explained.

Figure 7:
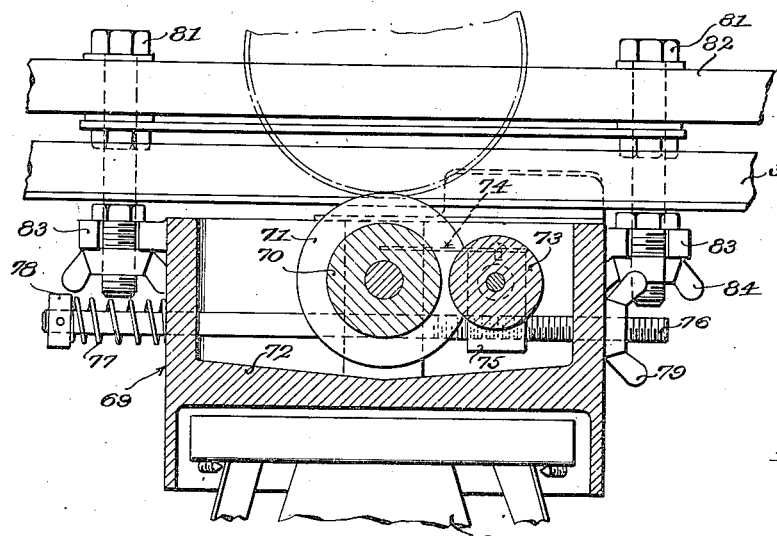
Fig. 7 is an enlarged longitudinal vertical sectional view of the means for applying paste to the can, such view being taken on the line 7—7 of Fig. 2.

As each can is moved along the tracks 34, a number of spots of paste are applied to the periphery of the can along a transverse line of the machine and this is accomplished by the paste-applying mechanism 69 which is best illustrated in Fig. 7. As shown in that figure, a paste-applying roller comprises a body 70 having projecting annular peripheral flanges 71 which dip into paste contained in a receptacle 72. In Fig. 7, it may be seen that as a can travels along the tracks 34, paste on the edge portions of the flanges will transfer from the roller to the can.

For controlling even distribution of the paste, the roller cooperates with a similar smaller roller 73 having flanges which project into the grooves or spaces of the roll 70, and this roll 73 also acts to wipe or scrape the periphery portion of the wheel 70 to prevent solid particles, such as grains of corn or the like from passing from the receptacle 72 on to the can to which the paste is applied. Scraper blades 74 cooperate with the wheel 73 and engage the ends of the roller 70 to control the amount of paste traveling upwardly with the roller 70.

For adjustably mounting the roller 73, it is carried by bearing blocks 75 having internal threads engaging the threads of bolts 76 which extend through the paste pot. Coil springs 77 are arranged between the paste pot and heads 78 at certain ends of the rods. Thumb nuts 79 engage the other ends of the rods. It will, therefore, be understood that the springs yieldingly urge the roller 73 toward the roller 70 and the position of the roller 73 in reference to the rods can be adjusted by turning the bolts relatively to the blocks 75.

Any suitable means such as an electric heater 80 may be employed to keep the glue in the pot 72 in fluid condition.

In order to accommodate cans of different diameters the paste-applying mechanism is adjustable lengthwise of the machine and for this purpose bolts 81 extend through longitudinal vertical slots in the side bars 82 of the frame of the machine. Notched ears 83 at the sides of the paste pot engage the lower end portions of these bolts and are secured in position by thumb nuts 84. When the nuts are loosened, the paste pot can be slipped laterally out of the machine.

In order that the paste roller 70 may rotate in timed relation relatively to the cans rolling through the machine, the shaft 85 of the roller, extends through one end of the paste pot and is provided with a ratchet wheel 86. A pair of reversely arranged pawls 87, 88, cooperate with the ratchet wheel and are carried by a supporting member 89 which is moved toward and away from the shaft 50 by means of a pitman 90 driven by an eccentric 91 on the shaft 50.

From the above it will be understood that as each can is rolled through the leading end portion of the machine, a number of spots of glue will be applied to the periphery of the can, and as the rollers 63 are of frustro-conical form and hold portions of the belts at angles to each other, the belts will not contact with the glue.

The arrangement of the parts is such that after the spots of glue have been applied to each can the can will move a revolution and these spots of glue will be brought into engagement with the leading end 92 of the top label of a stack 93, and as the can continues to roll forward, the label will be withdrawn from the stack and will be wrapped about the can. From Fig. 4 it may be seen that vertically arranged side plates 94 are positioned at opposite sides of the label stack, and it will be noted that each can in travelling across the stack will roll on the upper edges of these plates, and as these edges are positioned above the upper surface of the major portion of each label, the label will readily wrap around the can as the latter rolls forward over the label pile.

As each can travels over the label pile, its ends engage special horizontal guides 95 and 96, each having beveled ends to facilitate the movement of the cans between the guides. These guides are adjustable toward and away from one another through the instrumentality of means hereinafter described, and as heretofore mentioned the trailing ends of the tracks 34 are adjustable laterally with the guides. For this purpose, each track 34 (see Fig. 5) has a bracket 97 secured thereto and each bracket is secured to one of the guides 95 and 96.

The opposite ends of each guide are supported by transversely arranged rods 98 carried by laterally movable blocks 99 that are slidable in bearings 100 supported by side bars 101 of the frame of the machine.

In order that the guides 95 and 96 may be moved toward or away from one another in unison, each guide block 99 (Fig. 14) has a notch 102 to receive the upper end 103 of a rocking lever 104. Four of these levers are used to correspond with the four guide blocks 99 and as shown in Fig. 5, each lever has its lower end pivotally secured to the machine frame by a horizontal pivot pin 105. Transversely arranged horizontal screws 106 are provided for each pair of levers 104. Each screw has its medial portion swiveled at 107 in a bearing on a part of the frame and the end portions of the screw have left and right screw threads 108 and 109 that engage the threads of nuts 110 mounted on the levers 104. One of the screws may be provided with a handle 111 to be used in turning the same, and the opposite end of this screw will have a sprocket wheel 112 so that the sprocket chain 113 may be employed to transmit movement from one of the screws to the other one of the screws.

For the purpose of taking care of non-uniformity of the lengths of cans, the horizontal guide 96 is yieldingly mounted. To this end its rods 98 slide transversely in the blocks 99 which support that particular guide, and coil springs 114 are positioned between the guide 96 and its blocks for yieldingly urging the guide 96 toward the guide 95.

As shown in Fig. 14, each of the guide blocks 99 may be calibrated as at 115 to aid the operator in setting the guides for cans of different lengths.

Figure 12:
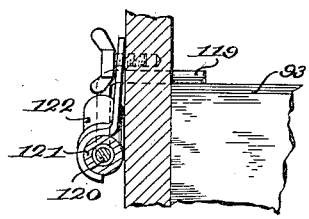
Fig. 12 is a sectional view taken on the line 12—12 of Fig. 11.
Figure 11:
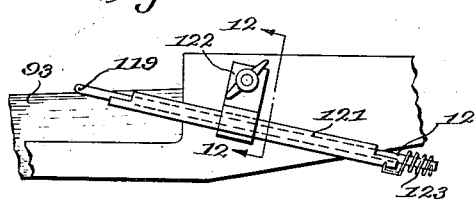
Fig. 11 is a side elevation of a detail of one of the fingers employed to prevent the labels from buckling while a label is withdrawn from the label stack.

For the purpose of holding the top label of the pile and preventing a can from picking up more than one label at a time, a spring finger 116 is mounted upon the cross bar 45 of the frame and bears upon the middle of the front edge of the top label. Other spring fingers 117 used for the same purpose are secured to the rails 34 and bear upon the side portions of the front edge of the top label. Lateral knives 118 are also connected to the sides of the label guides 118ª and bite down upon the side portions of the top labels adjacent to the leading ends of the latter for the purpose of preventing the labels from shifting forwardly, so that their leading ends are kept in a predetermined position. Other spring controlled fingers 119 press upon the top label near the trailing end of the latter. The fingers 119 are of special design, as shown in Figs. 11 and 12. Each of these fingers is of L-shape and its shank 120 is rotatably mounted in a tube 121 that is secured to one side of the label holder by a clamp 122. A coil spring 123 surrounds one end of the shank and has one of its ends secured to the shank and its other end secured to the tube, and the spring acts to turn the shank and press the finger 119 against the top label.

From the above it is believed clear that after a can is provided with a number of spots of glue by means of the roller 70, the can will roll forwardly a complete revolution and this will bring the spots of glue into contact with the leading edge of the topmost label, and as this label adheres to the can and the can rolls forwardly, the label will be released by the fingers 116, 117, knives 118 and fingers 119, and the fingers 119 will function to prevent buckling of the labels.

Figure 3:
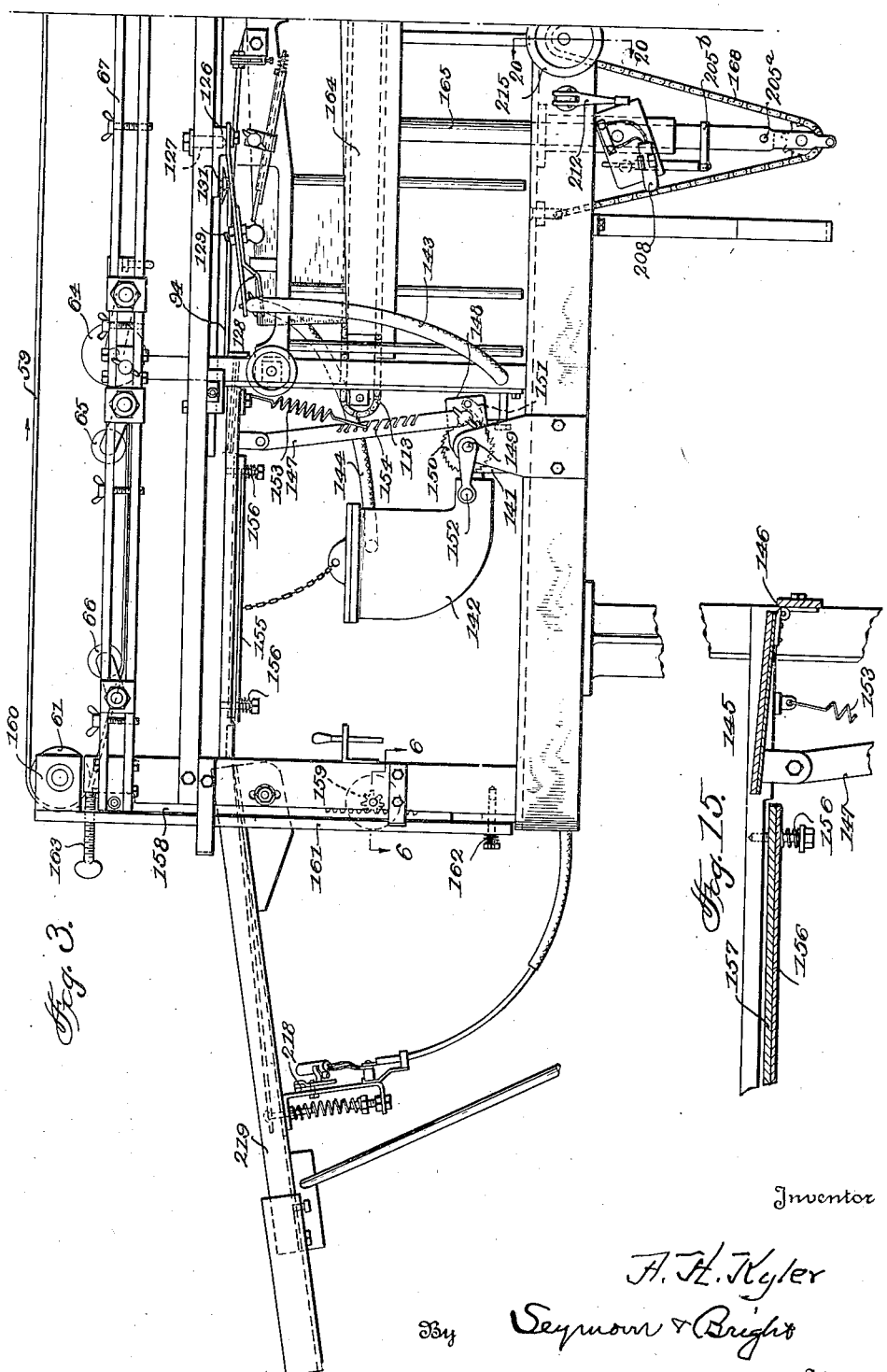
Fig. 3 is a similar view of the discharge end portion of the machine.

To complete the labeling it is necessary that the trailing edge portion of each label be provided with glue and this is accomplished by the following means. A paste bar 124, shown in detail in Figs. 8, 9 and 10, extends across the top of the label pile and is yieldingly supported by resilient arms 125. Each of these arms is supported at one end by a bracket 126 (see Fig. 3) which is adjustable lengthwise of the machine by means of a screw 127 which extends through a slot in one of the side bars of the frame. The opposite end of each arm is made in fork shape by the use of an additional plate 128 which is secured to the arm by a bolt 129. A pin 130 at the top of the bar extends through a hole in the arm and the plate 128 acts to normally hold the pin in the hole. Of course, by loosening the bolt 129, the paste bar can be immediately detached from either one of the supporting arms. A gauge screw 131 (see Fig. 3) is used between the frame and each arm to limit the upward movement of the paste bar.

Figure 9:
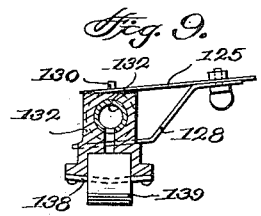
Fig. 9 is a vertical sectional view of the bar taken on the line 9—9 of Fig. 8.
Figure 8:
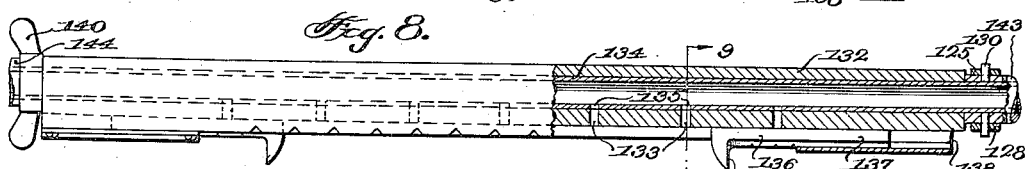
Fig. 8 is a side elevation partly in vertical section of the paste bar employed in applying paste to one end of each label.
Figure 10:
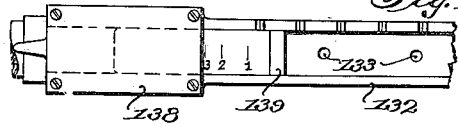
Fig. 10 is a bottom plan view of one end portion of the bar.

As best shown in Figs. 8, 9 and 10, the paste bar consists of a stationary tube 132 having a series of apertures 133 in its underside through which paste is discharged. An auxiliary or control tube 134 is rotatably mounted in the main tube and has apertures 135 which may be brought into or out of register with the apertures 133 for the purpose of regulating the amount of paste discharged or for entirely cutting off the flow of paste through the apertures 133.

In order to accommodate labels of different widths, the paste bar is provided with gauge pieces 136 having shanks 137 slidably mounted in keepers 138 carried by the paste bar. Depending fingers 139 are provided at the inner ends of the gauge pieces to engage the side edges of the label pile. A handle 140 is secured to the inner tube of the paste bar to control the position of that tube relatively to the main tube.

Paste is continuously fed through this tube while the machine is operating, by means of a pump 141 (Fig. 3) which receives paste from a reservoir 142. The pump forces the paste through a flexible tube 143 leading to one end of the paste bar. Another flexible tube 144 returns paste from the bar into the reservoir.

For the purpose of operating the pump, the cans passing through the machine travel over a pivoted section 145 (see Fig. 15) of the track. One end of this pivoted section is hinged at 146 to the frame and the opposite end is connected to the upper end of a link 147. The lower end of the link is pivotally connected to a pawl carrier 148 that is pivotally mounted on the shaft 149 of the pump. A ratchet wheel 150 fixed to the shaft, cooperates with a pawl 151 supported by the carrier, and obviously each time the carrier oscillates, the pawl will move the ratchet wheel forwardly and effect movement of the pump. A handle 152 is fixed to the pump shaft to permit operation of the pump while the machine is idle, for the purpose of placing the machine in condition for operation.

The pivoted section 145 of the track is normally held in a raised position by a spring 153 having one of its ends secured to the frame and its other end engaging one or the other of notches 154 on the link 147.

To smooth each label out as it leaves the pivoted section of the track, the latter is provided with a horizontal plate 155 supported by springs 156 that normally urge the plate upwardly. The upper surface of the plate may be provided with a soft rubber or felt mat 157 (Fig. 15) to assist in the smoothing operation, and it will be noted that while the cans are traveling over the plate 156 they will be pressed downwardly against the pad by means of the conveyer belts 59. As heretofore mentioned the rollers 64 and 66 may be shifted along the frame 67 to bring the pressure of the belts properly to bear on the cans. Roller 66 may be shifted along the frame so as to bring the pressure of the belts on the cans at a point where the lap end of the label strikes the pad so as to press the seam tight. Roller 64 is shifted so as to put pressure on the belts at the spot where the can is drawing the label from under the paste bar 124, to prevent the label from shifting on the can.

At this point it may be observed that in handling cans of different diameters, the frame 67 and the belt-guiding rollers which it carries should be raised and lowered, and to permit this each end of the frame 67 is provided with depending rack legs 158 meshing with hand-operated pinions 159. In order to take care of the slack in the belts, the roller 61 is mounted in bearings 160 arranged at the upper end of a lever 161. The lower end of this lever is loosely connected at 162 to the frame of the machine, and a hand screw 163 is positioned near the upper end of this lever and impinges against a stationary part of the machine for the purpose of moving the upper end portion of the lever away from the machine frame.

Referring to the label pile, it will be noted that the label stack elevator 164 is mounted on the upper end of a post 165 that slides in a vertical bearing 166 depending from the machine frame. A sprocket wheel 167 is rotatably connected to the lower end of the elevator post and engages a sprocket chain 168. The chain has one of its ends secured at 169 to the frame of the machine and such chain passes over a sprocket wheel 170 arranged on a cross shaft 171.

As best shown in Figs. 16 to 22 inclusive, the sprocket wheel 170 forms a part of a clutch member 172 that is keyed to the shaft 171 as shown at 174. The clutch member cooperates with another clutch member 173 that is loose on the shaft 171. Tooth pins 175 are slidably arranged on the member 173 and they are normally pressed into projected positions by means of springs 176 so that they can engage the notches 177 of the clutch member 172. Screws 178 are radially arranged in the member 173 and engage notches 179 in the pins to limit sliding movement of the pins. A worm gear 180 on the clutch member 173 is driven by a worm 181 on a shaft 182 extending longitudinally of the machine, and each time the shaft is turned in the proper direction movement will be imparted to the sprocket chain 168 to raise the elevator post 165. A weight 183 assists in this operation.

Intermittent movement is imparted to the shaft 182 whenever the label pile is to be elevated but as long as the label pile is in proper elevated position to feed labels to the cans, the shaft 182 remains idle. Such control is effected in the following way. The leading end of the machine is provided with a reciprocating lever 184 driven by the shaft 50 and this lever through the instrumentality of a link 185 causes vertical reciprocation of a rod 186. The lower end of this rod, as best shown in Fig. 24, is pivotally connected at 189 to an arm 188 that is mounted for oscillation on the shaft 182. The arm 188 carries a projecting pin 187 which is adapted to come in contact with a pawl carrier 190 whenever the latter comes into the path of movement of the pin. Normally it is out of such path of movement. For the purpose of placing it in the path, the pawl carrier is connected to one end of a lever rod 191 (Figs. 16, 17 and 18) that extends through a cradle 192 pivotally mounted for movement on a horizontal axle 193 that is suspended from the frame. The other end of the rod is provided with a plate 194 which is depressed by means of a rod 195 that is actuated at certain times by cans passing through the machine, as will be explained later. The cradle 192 has impingement screws 196 on which the rod 191 rests and by means of which the position of the rod may be adjusted. A counter-weight 197 is adjustably mounted on the rod and it normally acts to hold the rod in such position that the pawl carrier 190 (Fig. 24) cannot be struck by the pin 189. However, when the can-actuated rod 195 depresses the plate 194 and thereby swings the rod 191 about the axis 193, the pawl carrier 190 will be swung upwardly into position to be struck by the pin 187, with the result that a pawl 198 on the pawl carrier, will move a ratchet wheel 199 fixed on the shaft 182, to cause that shaft to turn and actuate the label platform. A resilient pawl 200 also coacts with the ratchet wheel to prevent reverse movement of the latter.

As best shown in Figs. 2 and 5, the rod 195 which controls the operation of the label elevator, is provided intermediate its length with a turn buckle 201 for adjusting the length thereof and the upper end of this rod has a threaded connection 202 with a Z-shaped bar 203, the upper end 204 of which is in the path of the cans rolling over the label elevator. As long as the labels are at a definite height the cans will not contact with the part 204, but as soon as a sufficient number of labels have been removed by the cans, cans will come into contact with and depress the part 204. It in turn will depress the rod 195 and cause the lever 191 to move the pawl carrier 190 into position where it will be struck by the pin 187 that is constantly reciprocated up and down due to movement of the shaft 50. Each time this comes to pass, the shaft 182 will be turned and will drive the clutch and thereby cause the sprocket wheel 170 to drive the chain 168 and elevate the elevator to the desired height.

The post 165 of the label elevator is provided with an abutment pin 205$^a$ designed to contact with a yoke 205$^b$ carried by a rod or link 205 that is suspended from a bracket 206 pivotally mounted at 207 on the bearing 166. A mercury switch 208 or the like is carried by the bracket and is interposed in the wiring system of an electric lamp 221 (Figs. 1 and 25). Consequently the lamp will be automatically switched on when it is necessary to recharge or resupply the label elevator with additional labels. The switch 208 is removably mounted in a spring clamp 208ª so that it may be reversed end for end to keep the lamp 221 lighted in case the machine is used in a dark location. Under such conditions the lamp will go out when the label magazine must be refilled.

In order that the label elevator may be actuated by hand to permit lowering of it for resupply purposes or adjustment without disturbing the positions of the parts in the mechanical drive, a stem 209 (see Figs. 18 and 20) is slidably mounted in the machine frame and it is provided at one end with a fork 210 engaging an annular groove 211 in the clutch member 172. The outer end of the stem is provided with a handle 212 which is pivotally mounted on the stem at 213. When the handle is turned to a position parallel to the stem, a cam surface 214 at one end of the handle will ride on the surface of the frame and cause the clutch member 172 to move out of engagement with the teeth 175. Then the hand wheel 215 at one end of the shaft 171 may be turned to cause the sprocket chain 168 to operate the label platform. Springs 216 and 217 surrounding respectively the shaft 171 and the stem 209, are employed to normally hold the clutch in operative position. The pins 175 of the clutch permit turning movement of the part 172 in one direction relatively to the part 173 when the teeth are in engagement to take care of fine adjustments of the label platform.

A second automatic switch 218 (see Figs. 3 and 25) is associated with the discharge runway 219 of the machine and is in circuit with the motor 46 for automatically cutting off the machine in case the cans discharged are not removed as rapidly as they leave the machine. Electric lights 220 and 221 may also be arranged in the wiring circuit for illumination and signalling purposes.

Referring to Fig. 25, it will be noted that the motor 46 is connected by suitable wiring to line wires 222 and 223 by which current is fed to the machine, and the motor may be controlled by a main switch 224. The electric heater 80 is also connected up with the wiring and is controlled by a switch 225. From this diagram it may be seen how the switches 208 and 218 are located in the motor circuit.

It is believed that the operation of the machine may be readily understood from the foregoing, but referring briefly to the operation, it may be seen that the unlabeled cans are introduced into the feed end of the machine and they roll down the runway 30. Even though the cans may be in abutting relation on this runway, they will be caused by the roller 52 to enter the machine in spaced relation. As each can is propelled by the belts 59 along the tracks 34, it will be provided with a series of spots of glue by means of the roller 70 and then it will roll forwardly and these spots of glue will be brought into contact with the leading edge portion of the top label of the pile. Then as the can rolls forwardly over the label stack, the label which is stuck to the glue on the can will be detached from the label pile and will be wrapped about the can. As the trailing end of the label will be supplied with paste from the paste bar 132, of course, the paste on the trailing end of the label will be brought into overlapping relation with the end of the label that is already secured to the can and then as the can continues to roll over the plate 155, the label will be smoothed out and pressed on to the can, after which the can will be discharged by means of the runway 219.

While I have disclosed what I now consider to be a preferred embodiment of the invention in such manner that the same may be readily understood by those skilled in the art, I am aware that changes may be made in the details disclosed without departing from the spirit of the invention as expressed in the claims.

What I claim and desire to secure by Letters Patent is:

1. In a can labeling machine, sectional tracks for guiding cylindrical cans as they roll through the machine, means for applying spots of glue to each can as it rolls along the tracks, label-supply means positioned beneath the tracks for supporting a stack of labels in such position that the spots of glue applied to a can will adhere to the leading edge portion of the topmost label and withdraw the label from the stack, means for applying glue to the trailing end portion of each label, means for propelling the cans along the tracks and for smoothing each label on to a can after it has been wrapped on the can, rotatable means associated with the leading sections of the tracks for spacing the cans as they roll into the machine, and adjustable means for regulating the distance between the rotatable means and the leading sections of the tracks, said adjustable means including a spring for yieldingly urging the rotatable means toward the leading sections of the tracks.

2. In a can labeling machine, a frame, can-guiding tracks supported by the frame, an auxiliary frame arranged above the tracks and movable upwardly and downwardly, pulleys rotatably mounted on the first mentioned frame, means for driving one of said pulleys, an endless belt engaging the pulleys and driven by the last-mentioned pulley, rollers supported by the auxiliary frame and engageable with the belt for holding the lower bight of the belt in definite positions relatively to the tracks, means for adjusting the height of the auxiliary frame, means for applying spots of glue to cans as they are propelled along the tracks by said belt, label-supply means positioned below the tracks for supplying labels to the cans as the cans roll through the machine, and means for supplying glue to the trailing end portion of each label.

3. In a can labeling machine, a frame, can-guiding tracks supported by the frame, an auxiliary frame arranged above the tracks and movable upwardly and downwardly, pulleys rotatably mounted on the first mentioned frame, means for driving one of said pulleys, an endless belt engaging the pulleys and driven by the last-mentioned pulley, rollers supported by the auxiliary frame and engageable with the belt for holding the lower bight of the belt in definite positions relatively to the tracks, means for adjusting the height of the auxiliary frame, means for applying spots of glue to cans as they are propelled along the tracks by said belt, label supply means positioned below the tracks for supplying labels to the cans as the cans roll through the machine, means for supplying glue to the trailing end portion of each label, and means cooperating with one of the belt-guiding pulleys for adjusting the tension of the belt whenever the auxiliary frame is raised or lowered.

4. In a can labeling machine, a frame, can-guiding tracks supported by the frame, an auxiliary frame arranged above the tracks and movable upwardly and downwardly, pulleys rotatably mounted on the first mentioned frame, means for driving one of said pulleys, an endless belt engaging the pulleys and driven by the last-mentioned pulley, rollers supported by the auxiliary frame and engageable with the belt for holding the lower bight of the belt in definite positions relatively to the tracks, means for adjusting the height of the auxiliary frame, means for applying spots of glue to cans as they are propelled along the tracks by said belt, label-supply means positioned below the tracks for supplying labels to the cans as the cans roll through the machine, means for supplying glue to the trailing end portion of each label, and means for adjusting the belt-guiding rollers along the auxiliary frame.

5. In a can labeling machine, sectional tracks for guiding cylindrical cans as they roll through the machine, means for applying spots of glue to each can as it rolls along the tracks, label-supply means positioned beneath the tracks for supporting a stack of labels in such position that the spots of glue applied to a can will adhere to the leading edge portion of the topmost label and withdraw the label from the stack, means for applying glue to the trailing end portion of each label, means for propelling the cans along the tracks and for smoothing each label on to a can after it has been wrapped on the can, the leading sections of said tracks having their leading ends pivotally mounted for movement about parallel substantially vertical axes, the other ends of said leading sections being movable toward and away from one another and being joined to intermediate track sections, and means for simultaneously moving the last-mentioned intermediate sections and the trailing ends of the leading sections, toward and away from one another.

6. In a can labeling machine, can-guiding tracks along which cylindrical cans roll through the machine, means for propelling the cans along said tracks, a backwardly and forwardly moving member, a label platform arranged beneath the tracks and adapted to support a stack of labels and to supply them to the cans as the cans roll along the tracks, means for applying glue to each can and to each label, feeding means for the label platform actuated by said member, and means including a part arranged in the path of the rolling cans for controlling the periods when the platform feeding means is actuated by said member, said part being positioned at one side of the stack of labels and being normally prevented by the uppermost labels of the stack from engaging the cans.

7. In a can labeling machine, tracks along which cans are rolled and means for supplying spots of glue to each can as it rolls along the tracks, said means comprising a paste receptacle, a roller dipping into said receptacle and having spaced annular peripheral flanges between which peripheral grooves are arranged, said flanges projecting into the path of movement of the cans along the tracks, and an auxiliary roller cooperating with the first-mentioned roller for regulating the amount of paste fed by the first-mentioned roller and for scraping the latter, said auxiliary roller having a grooved periphery into which the flanges of the first-mentioned roller extend, and means for yieldingly urging the auxiliary roller toward the first-mentioned roller.

8. In a can labeling machine, tracks along which cans are rolled and means for supplying spots of glue to each can as it rolls along the tracks, said means comprising a paste receptacle, a roller dipping into said receptacle and having spaced annular peripheral flanges between which peripheral grooves are arranged, said flanges projecting into the path of movement of the cans along the tracks, an auxiliary roller cooperating with the first-mentioned roller for regulating the amount of paste fed by the first-mentioned roller and for scraping the latter, said auxiliary roller having a grooved periphery into which the flanges of the first-mentioned roller extend, and means for yieldingly urging the auxiliary roller toward the first-mentioned roller, the last-mentioned means comprising bearings for the auxiliary roller, bolts having threaded engagement with said bearings and passing slidably through opposite walls of the receptacle, a nut on one of the outer end portions of each bolt, an abutment at the opposite outer end portion of each bolt, and a spring surrounding each bolt and arranged between the last-mentioned abutment and a wall of the receptacle.

9. In a can labeling machine, tracks along which cans are rolled and means for supplying spots of glue to each can as it rolls along the tracks, said means comprising a paste receptacle, a roller dipping into said receptacle and having spaced annular peripheral flanges between which peripheral grooves are arranged, said flanges projecting into the path of movement of the cans along the tracks, an auxiliary roller cooperating with the first-mentioned roller for regulating the amount of paste fed by the first-mentioned roller and for scraping the latter, said auxiliary roller having a grooved periphery into which the flanges of the first-mentioned roller extend, means for yieldingly urging the auxiliary roller toward the first-mentioned roller, the last-mentioned means comprising bearings for the auxiliary roller, bolts having threaded engagement with said bearings and passing slidably through opposite walls of the receptacle, a nut on one of the outer end portions of each bolt, an abutment at the opposite outer end portion of each bolt, a spring surrounding each bolt and arranged between the last-mentioned abutment and a wall of the receptacle, and scraper blades arranged on said bearings and engaging the ends of the first-mentioned roller.

10. In a can labeling machine, a frame, tracks supported by the frame and along which cylindrical cans roll through the machine, means for supplying spots of glue to each can as it rolls through the machine, means for supporting a stack of labels beneath the tracks and for feeding the labels to the cans as they roll along the tracks, means for circulating paste in an endless path and incluuding a hollow paste bar extending across the stack of labels, said bar comprising an outer apertured tube and an inner apertured tube, the inner tube being rotatable relatively to the outer tube for controlling the discharge of paste from the tubes, and adjustable gauge members supported by the paste bar and having depending fingers engageable with the side edge portions of the label stack.

11. In a can labeling machine tracks along which cans may roll, means for supporting a stack of labels below the tracks and for feeding the labels upwardly relatively to the tracks, the portions of the tracks above the label stack comprising horizontal guide members, bearing blocks supporting said guide members, yielding means to permit one of the guide members to yield relatively to its bearing blocks, levers having their lower ends pivotally mounted for movement about horizontal axes, the upper ends of the levers engaging said bearing blocks, and means for simultaneously moving the levers of opposite pairs toward and away from one another for adjusting the distance between said guide members.

12. In a can labeling machine having tracks along which cans roll, a label platform for supporting labels relatively to the tracks in such position that the labels may be detached from the stack by adhering to glue on the cans, means for feeding said platform upwardly comprising a sprocket chain, a horizontal shaft, a clutch member rotatable with the shaft but movable axially relatively to the shaft, a sprocket wheel fixed to the clutch member and engaging the sprocket chain, a second clutch member loosely mounted on the shaft and having teeth engageable with the first-mentioned clutch member, and worm gearing for driving the clutch member which is loosely mounted on the shaft.

13. In a can labeling machine having tracks along which cans roll, a label platform for supporting labels relatively to the tracks in such position that the labels may be detached from the stack by adhering to glue on the cans, means for feeding said platform upwardly comprising a sprocket chain, a horizontal shaft, a clutch member rotatable with the shaft but movable axially relatively to the shaft, a sprocket wheel fixed to the clutch member and engaging the sprocket chain, a second clutch member loosely mounted on the shaft and having teeth engageable with the first-mentioned clutch member, and worm gearing for driving the clutch member which is loosely mounted on the shaft, each tooth of the loose clutch member being loosely mounted on that member and being spring projected.

14. In a can labeling machine having tracks along which cans roll, a label platform for supporting labels relatively to the tracks in such position that the labels may be detached from the stack by adhering to glue on the cans, means for feeding said platform upwardly comprising a sprocket chain, a horizontal shaft, a clutch member rotatable with the shaft but movable axially relatively to the shaft, a sprocket wheel fixed to the clutch member and engaging the sprocket chain, a second clutch member loosely mounted on the shaft and having teeth engageable with the first mentioned clutch member, worm gearing for driving the clutch member which is loosely mounted on the shaft, and means controlled by cans travelling along said tracks for controlling said worm gearing.

15. In a can labeling machine having tracks along which cans roll, a label platform for supporting labels relatively to the tracks in such position that the labels may be detached from the stack by adhering to glue on the cans, means for feeding said platform upwardly comprising a sprocket chain, a horizontal shaft, a clutch member rotatable with the shaft but movable axially relatively to the shaft, a sprocket wheel fixed to the clutch member and engaging the sprocket chain, a second clutch member loosely mounted on the shaft and having teeth engageable with the first mentioned clutch member, worm gearing for driving the clutch member which is loosely mounted on the shaft, and means controlled by cans travelling along said tracks for controlling said worm gearing, the last mentioned means including a second shaft, a ratchet means for operating the second shaft, and motor driven means for actuating the ratchet means.

16. In a can labeling machine having tracks along which cans roll, a label platform for supporting labels relatively to the tracks in such position that the labels may be detached from the stack by adhering to glue on the cans, means for feeding said platform upwardly comprising a sprocket chain, a horizontal shaft, a clutch member rotatable with the shaft but movable axially relatively to the shaft, a sprocket wheel fixed to the clutch member and engaging the sprocket chain, a second clutch member loosely mounted on the shaft and having teeth engageable with the first mentioned clutch member, worm gearing for driving the clutch member which is loosely mounted on the shaft, and means controlled by cans travelling along said tracks for controlling said worm gearing, the last mentioned means including a second shaft provided with a ratchet wheel, a pawl for moving said ratchet wheel, motor operated means for actuating the pawl, and means controlled by the cans for moving the pawl into position to be actuated by the motor operated means.

17. In a can labeling machine, tracks for guiding cylindrical cans as they roll through the machine, means for applying spots of glue to each can as it rolls along the tracks, label supply means positioned beneath the tracks for supporting a stack of labels in such position that the spots of glue applied to a can will adhere to the leading edge portion of the topmost label and withdraw the label from the stack, mechanical means for elevating said label supply means, said mechanical means including a control member directly actuated by the cans as they pass over the label supply means, said member being positioned at one side of the stack of labels and being normally prevented by the uppermost labels of the stack from engaging the cans, means for applying glue to the trailing end portion of each label, and means for propelling the cans along the tracks and for smoothing each label on to a can after it has been wrapped on the can.

ALBERT H. KYLER.